United States Patent [19]
Niki et al.

[11] 3,731,820
[45] May 8, 1973

[54] RECTILINEAR MOTION DEVICE FOR A MECHANICAL HANDLING MACHINE

[75] Inventors: Akiri Niki, Kariya; Satoshi Hirose, Wakabaya; Jiro Ohara, Nagoya, all of Japan

[73] Assignee: Nagoya Kiko Co., Ltd., Negoya, Japan

[22] Filed: July 6, 1970

[21] Appl. No.: 52,396

[30] Foreign Application Priority Data
July 8, 1969 Japan ..............................44/53947
June 10, 1970 Japan ..............................45/50142

[52] U.S. Cl. ..............................214/1 BB, 74/469
[51] Int. Cl. ..............................B66c 1/42
[58] Field of Search ..............................74/469, 491, 521; 214/1 CM, 1 BB, 772, 769

[56] References Cited

UNITED STATES PATENTS 521,256  6/1894  Browne ..............................74/521 X
3,268,092  8/1966  Hainer et al. ..............................214/1 CM Primary Examiner—Milton Kaufman
Attorney—Donald Gunn

[57] ABSTRACT

A rectilinear motion device which includes a mechanical arm having a pair of links or levers which extend and retract. The two levers are joined together at an elbow mechanism. The two levers extend at equal angles with respect to a reference line through the elbow mechanism. The ends of the two levers are respectively fixed with regard to the structure of the device and extensible to carry an arm which preferably maintains a planar position and which extends and retracts with the pair of levers.

9 Claims, 10 Drawing Figures

Patented May 8, 1973
3,731,820
7 Sheets-Sheet 1
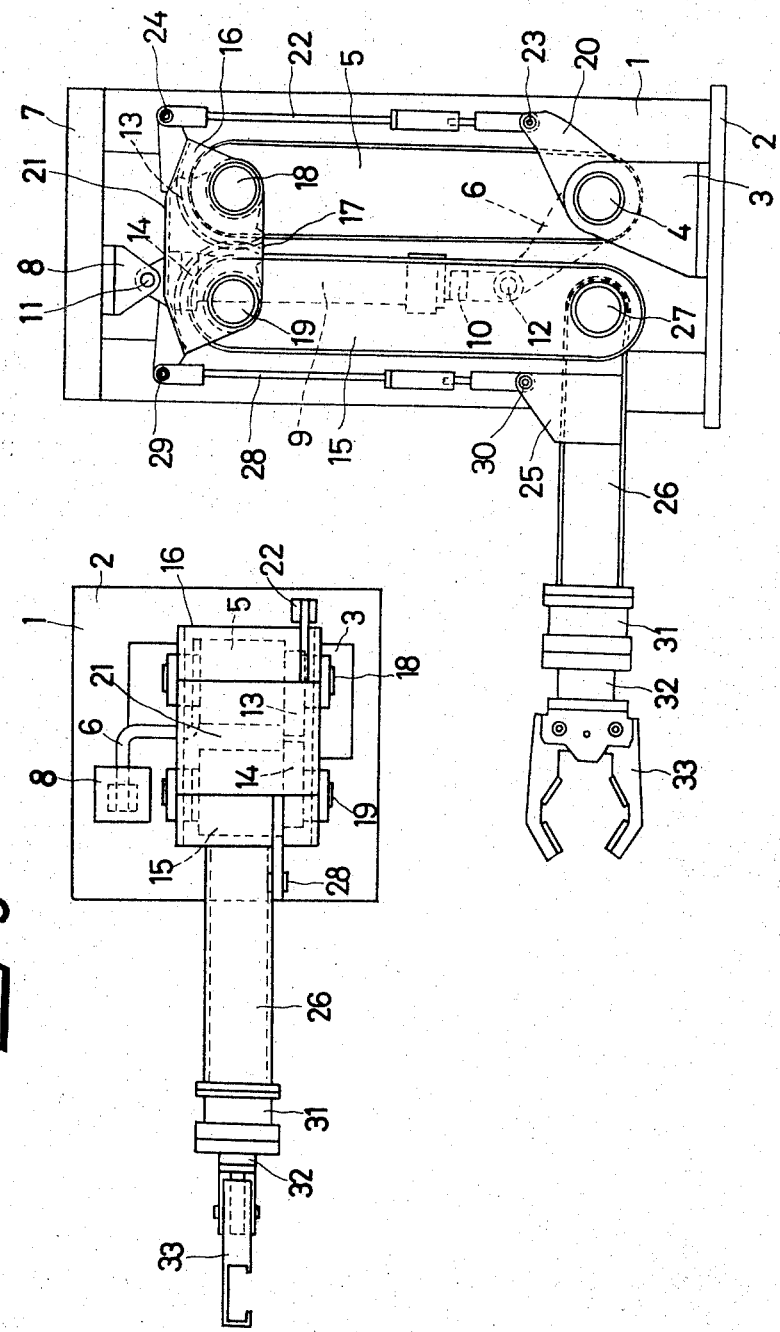
BY *Donald Gunn*

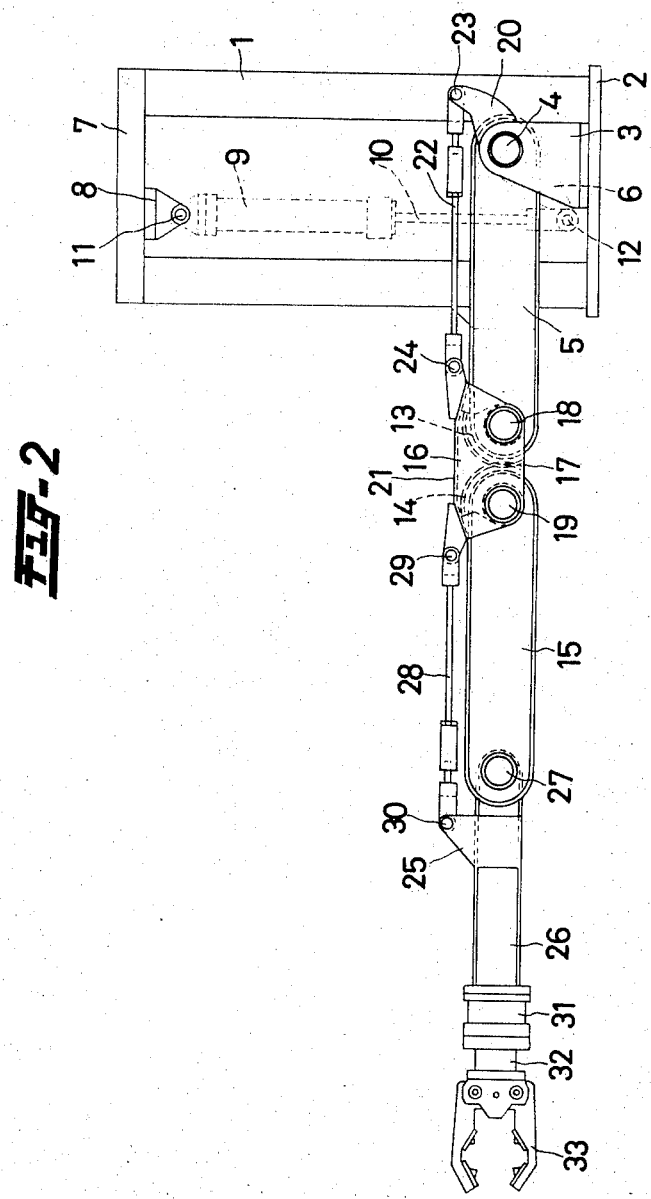

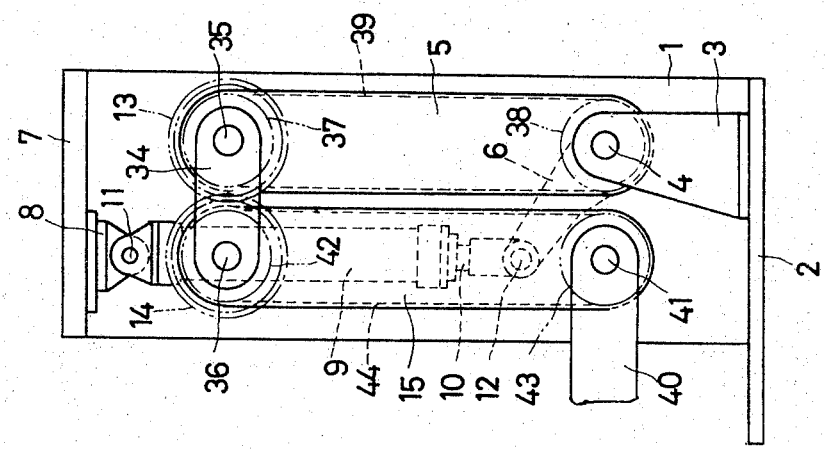

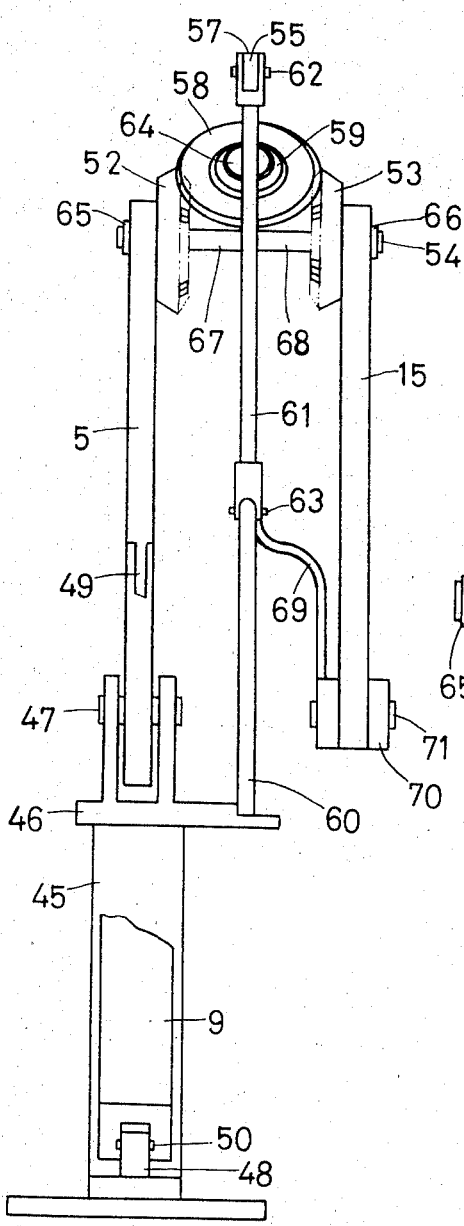
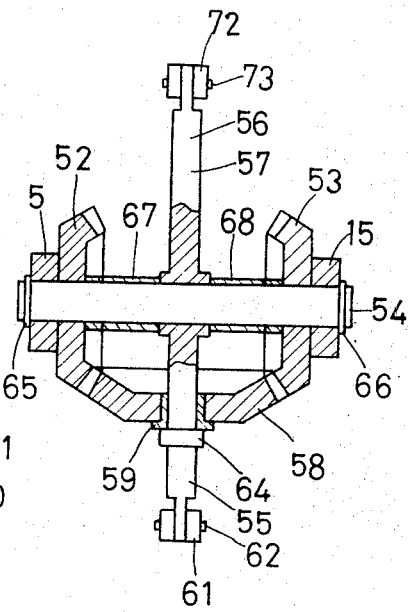

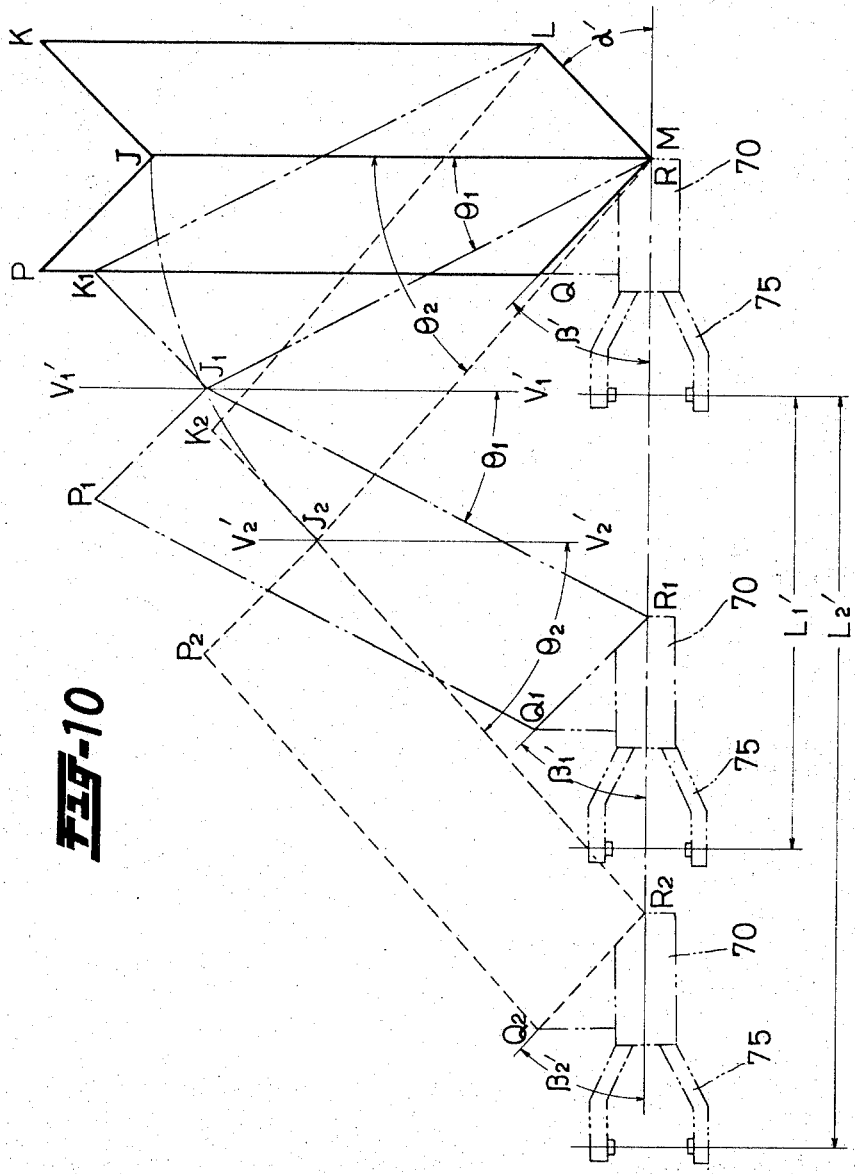

3,731,820

RECTILINEAR MOTION DEVICE FOR A MECHANICAL HANDLING MACHINE

SUMMARY OF PROBLEM AND SOLUTION

The present invention relates to a rectilinear motion device for use in a mechanical handling machine. In the handling of materials in an environment subjected to gaseous fumes, radiation, excessive heat, and other elements, it is quite often difficult to obtain personal assistance. Consequently, a mechanical handling device or machine is preferably used. However, such a mechanical handling machine typically includes arms which are articulated for extension and retraction, either free and unsupported in space, or for movement guided by a rail or other mechanism. When the arm extends freely in space, quite often its motion is not rectilinear, and hence, control of the machine to reach and grasp is somewhat difficult. When movement of the device is controlled by rails or other track mechanisms, additional expense and complexity are added.

Consequently, the present invention has as one goal the provision of a new and improved, compact, smoothly acting device for causing the arm of a mechanical handling machine to move along a horizontal straight line without the aid of rails or other guide mechanisms. The present invention is summarized as including a supporting structure for the arm, which is comprised of a horizontal, extended portion, and a pair of movable links or levers. The two levers connect at an elbow. The elbow is so constructed that the angle of the two levers with respect to the elbow, remains equal during extension or retraction of the arm. The two levers are pivotally connected at the lower ends. One is pivotally connected on a shaft with a crank throw connected with a hydraulic cylinder. The hydraulic cylinder rotates the crank which, in turn, rotates the shaft and the lever. This causes the first lever to rotate to an angle, and through operation of the elbow, the second lever is maintained at a like angle. The second lever is connected at its free end to the forearm portion of the machinery. This thereby achieves extension of the arm.

Many objects, features and advantages of the present invention will be readily understood from the following written description of the preferred embodiments of the invention with reference to the accompanying drawings, which are:

FIG. 1 is a side view of the preferred embodiment of the device of the present invention in which the arm of the mechanical handling machine is shown in its retracted position;

FIG. 2 is a side view of the first embodiment in which the arm of the handling machine is shown in its fully extended position;

FIG. 3 is a plan view of the embodiment shown in FIG. 1;

FIG. 5 is a side view of another embodiment of the mechanical handling apparatus of the present invention shown in its retracted position;

FIG. 6 is a right hand side view of still another embodiment of the device according to the present invention in which the arm of the mechanical handling machine is shown in its retracted position;

FIG. 8 is a front view of the structure shown in FIGS. 6 and 7;

FIG. 9 is a sectional view taken along the line Y — Y in FIG. 6; and,

FIG. 10 is a schematic diagram showing various intermediate positions of the arm extended by the embodiment shown in FIGS. 6 – 9.

Figure 4:
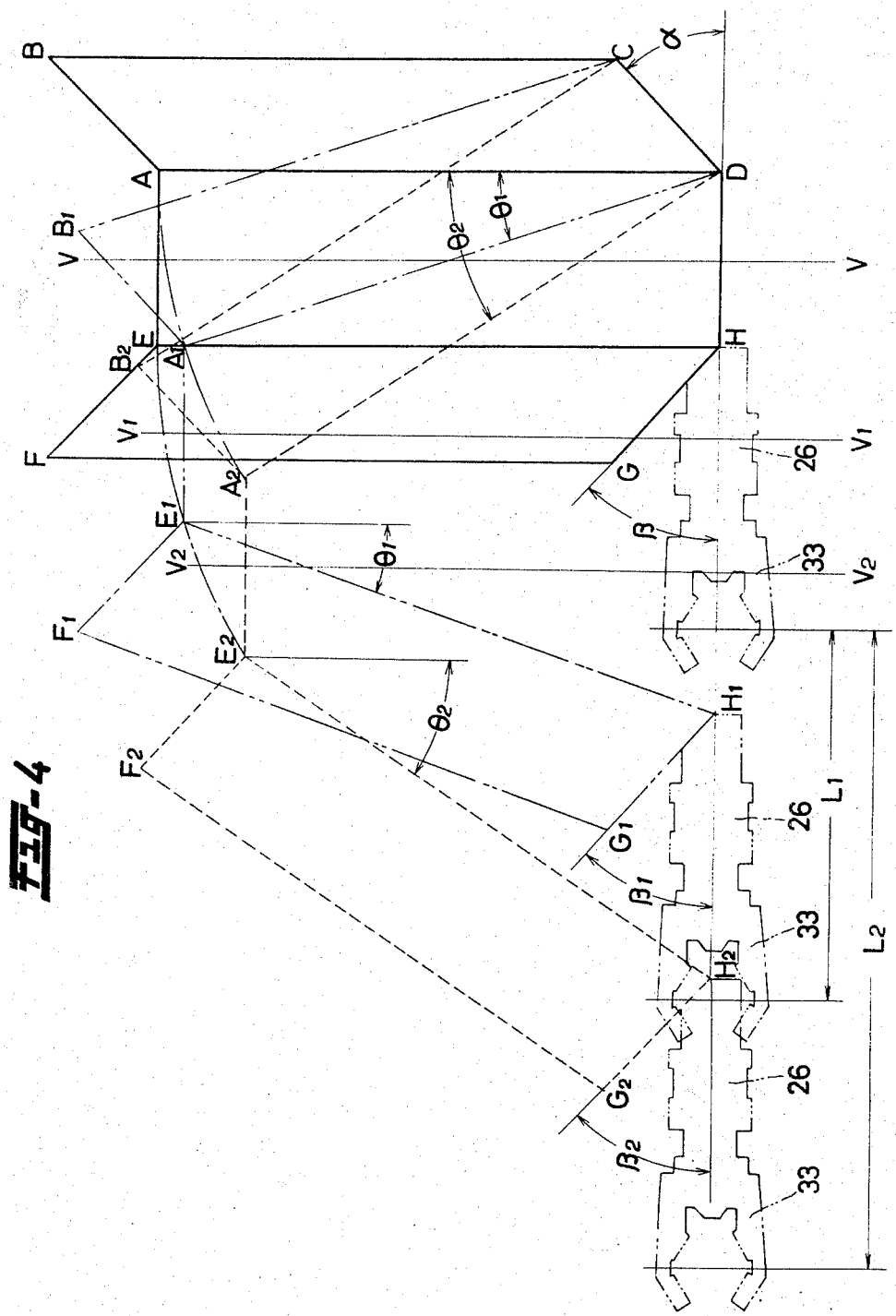
FIG. 4 is a schematic diagram showing various intermediate positions of the arm between the fully retracted position and the fully extended position.

Attention is first directed to FIGS. 1, 2 and 3 of the drawings which show a first embodiment of the device of the present invention. In FIG. 1, a support structure 1 which is generally in the form of a rectangular box, incorporates a bottom plate 2 which supports a bracket 3 having a pair of upstanding members. The upstanding members of the bracket 3 support the ends of a rotatable shaft 4. The rotatable shaft is preferably journaled and supported in appropriate bearings. The shaft 4 supports a lever 5 held in its normal upright position of FIG. 1. The lever 5 is the first movable segment of the entirety of the mechanical arm. The lever 5 is of rectangular construction and is gussetted or reinforced for strength. Other constructions can be used equally well.

The lever 5 is fixed to the shaft 4. Additionally, a crank arm 6 extends upward and to the left at an angle as shown in FIG. 1. The crank arm is common to the shaft 4. Consequently, the shaft 4, the lever 5, and the crank 6 rotate as a unit about an axis of rotation determined by the journaled support of the shaft 4 in the bracket 3. The crank 6 is offset at its end portion as best shown in FIG. 3. This locates the end of the crank 6 off to the side and somewhat remote from the several components of the extendible arm as will be described. This then permits access to the crank 6 for actuation in a manner to be described hereinafter.

The box like structure 1 preferably incorporates upstanding vertical members extending from the bottom plate 2 and which support a top plate 7. The top plate 7 supports a fixed mounting plate 8 on its nether side as shown in FIG. 1. The fixed mounting plate incorporates a pair of downwardly pointed, bifurcated brackets which support the upper end of the vertically mounted hydraulic cylinder 9. The hydraulic cylinder 9 incorporates a piston rod 10 which is extendible upwardly and downwardly. The hydraulic cylinder 9 is pivotally connected by means of a pin 11 extending through the bracket 8 as shown in FIG. 1. At the lower end, the piston rod 10 is pivotally connected to the crank 6 by means of the pin 12. Being pin connected at each end, the hydraulic cylinder is free to rotate to an angle determined by movable components of the present invention.

The lever 5 is arcuately curved or rounded at its upper end as shown in FIG. 1. More importantly, the lever 5 carries a sector gear 13 on its upper end, and a sector gear 14 is adapted to engage with the sector gear 13. The gear 14 is carried on the upper end of an additional lever 15. The gears 13 and 14 are fixed respectively on shafts 18 and 19 near the bottom edge 17 of a trapezoidal connecting member or elbow 16. The gears 13 and 14 preferably mesh and are preferably shaped like one another. The levers 5 and 15 are adapted to rotate to the same extent, but in opposite directions with respect to the elbow 16. The levers 5 and 15 are of symmetrical construction to one another. Moreover, they are the same length. Additionally, they are connected to the several rotatable shafts as illustrated in FIG. 1, and the shafts are preferably identical, one to the other.

As shown in FIG. 3, the crank arm 6 is located somewhat toward the back side of the equipment. As also shown in FIG. 1, a fixed arm 20 is located on the front side of the equipment and fixed to the bracket 3 so as to extend upwardly at an angle as illustrated. The lower end of a rod 22 is connected to the fixed mounting arm 20 which is carried on the support bracket 3. The upper end of the rod 22 is pivotally connected to a cross bar 21 which is carried on and made integral with the elbow 16. It should be kept in mind that the elbow 16 is somewhat U-shaped in cross section, and is inverted in its normal installed position of FIG. 1. It has a lower edge 17 previously mentioned. Extending across the stiff horizontal back member as viewed from the side in FIG. 1, the cross bar 21 extends to the right and left. The rod 22 is pivotally joined to a shaft 23 at its lower end, and a similar shaft 24 at its upper end.

The distance between the shafts 4 and 23 on the fixed arm 20 is equal to that between the shafts 18 and 24 at the elbow 16. Additionally, the lever 5 is of the same length as the rod 22.

Continuing on with FIG. 1, a mounting plate 25 is carried intermediate the ends of an arm 26. The arm 26 is connected at its back end as shown in FIG. 1 to the lower end of the lever 15 by means of a shaft 27. The shaft 27 is similar in construction to the shaft 4 previously mentioned. A rod 28 having the same length as the lever 15 is connected to the upper end of the mounting plate 25, and to the left hand end, as viewed in FIG. 1, of the uppermost part 21 of the elbow 16. A shaft 29 is found at the upper end of the rod 28 while the shaft 30 completes the lower end pivotal connection. The distance between the shafts 27 and 30 on the arm 26 is equal to the distance between the shafts 19 and 29 on the elbow 16.

The arm 26 carries near its outer end a rotary cylinder 31, and a clamp chuck 33 which is opened and closed by movement of a clamp cylinder 32.

Directing attention to the side view of FIG. 1, the handling machine as hereinbefore described includes a parallelogram defined by the lines connecting the shafts 18 and 24, 24 and 23, 23 and 4, and 4 and 18, or that which is represented by the points A, B, C, and D, in FIG. 4. An additional parallelogram is defined by the lines connecting the shafts 19 and 29, 29 and 30, 30 and 27, and 27 and 19, or that which is represented by the points E, F, G, and H, in FIG. 4. The two parallelograms are symmetrical with respect to a vertical line V — V which passes through the midpoint of a line drawn from the points A to E in FIG. 4.

In operation, the hydraulic cylinder 9 causes extension and retraction of the mechanical arm. When the piston rod 10 is in its retracted position as shown in FIG. 1, both the levers 5 and 15 are in the withdrawn or original upright position as shown in solid line in FIG. 4. The angle of inclination $\alpha$ of the fixed support arm 20 with respect to a horizontal line, hereinafter called "the angle of inclination" of the supporting member 20, and the angle of inclination $\beta$ of the line connecting the shafts 30 and 27 on the arm 26 with respect to a horizontal line, hereinafter called "the angle of inclination" of the arm 26 are equal to each other. As will be amply pointed out hereinafter, the arm 26 stays in the horizontal position while the angles $\alpha$ and $\beta$ remain equal.

As the piston rod 10 moves downwardly and somewhat forwardly as viewed in FIG. 1, the lever 5 rotates counterclockwise by an angle $\theta$ to a position shown in dot-dash line in FIG. 4. The parallel motion mechanism including the points A, B, C, and D, in FIG. 4, moves the elbow 16 in parallel movement to that of the horizontal line between the points H to D whereby the engagement of the segment gears 13 and 14 causes the lever 15 to turn clockwise by the same angle $\theta$ as shown in FIG. 4. Accordingly, the parallelogram defined by the lines connecting the points $A_1$, $B_1$, C and D, which is formed by the movement or distorsion of the upper portion of the parallelogram A - B - C - D, and the parallelogram defined by the lines connecting the points $E_1$, $F_1$, $G_1$, and $H_1$, which is formed by movement of the parallelogram E - F - G - H, are symmetrical with each other with respect to the vertical line $V_1$ — $V_1$, passing through the middle point of the line drawn between the points $A_1$ and $E_1$ in FIG. 4. Thus, the angle of inclination $\alpha$ of the supporting member 20 and the new angle of inclination $\beta$ of the arm 26 are equal to each other at the intermediate position achieved by movement of the lever 5 through the angle $\theta_1$, in the same manner as when the mechanism is in the retracted position represented by the full solid lines of FIG. 4. The arm 26 has been advanced by the distance $L_1$ from its original position, still remaining horizontal.

Consider next the possibility that the piston rod 10 extends further downwardly and toward the left as viewed in FIG. 1. The lever 5 turns counterclockwise further to the angle represented by $\theta_2$ which is shown in broken line in FIG. 4. The elbow member 16 again moves to a position parallel to the base line extending from the point H to the point D. The engagement of the gears 13 and 14 causes the lever 15 to turn again clockwise to an angle $\theta_2$ as shown in FIG. 4. A new parallelogram defined by the lines connecting points $A_2$, $B_2$, C and D, is formed. The parallelogram for the second lever is defined by the lines $E_2$, $F_2$, $G_2$, and $H_2$. The parallelograms are still symmetrical with each other with respect to the vertical lines $V_2$ — $V_2$, which passes through the midpoint of a line between the points $E_2$ and $A_2$ in FIG. 4. Accordingly, the angle of inclination $\alpha$ of the fixed support arm 20, and the new angle $\beta_2$ of the arm 26 are still equal to each other, and the arm 26 still remains horizontal, but is found in a position advanced by the distance $L_2$ from its original position.

The piston rod 10 continues to extend until the lever 5 is turned 90° from its original upright position to a point where the arm is in its fully stretched position and forms a horizontal straight line with the levers 5 and 15 aligned in the manner shown in FIG. 2.

On the other hand, as the piston rod 10 is retracted and the lever 5 returns to the position shown in solid line of FIG. 4, the parallel motion mechanism illustrated in FIG. 4 causes the connecting elbow 16 to continue in parallel movement backward while the engagement of the gear 13 with the gear 14 causes the lever 15 to move back in the same extent that the lever 5 is retracted such that the arm 26 is caused to retreat along the path it had taken previously when extended, and to move horizontally back to its original position.

Reference is now made to FIG. 5 of the drawings, where a second embodiment of the device of the present invention is illustrated. As in the first embodiment of the device shown in FIGS. 1 – 4, the lower end of the lever 5 and the crank arm 6 are mounted respectively on a shaft 4 which is rotatably carried by an upstanding bracket 3 on the bottom plate 2 of the support structure 1. The upper end of the cylinder 9 is fixed in the same manner as before, and the piston rod 10 functions in the same manner. The mounting 8 carried on the bottom side of the top plate 7 supports the hydraulic cylinder 9. The shafts 11 and 12 are found at opposite ends of the hydraulic cylinder 9.

Again, the lever 5 carries a gear segment 13 on its upper end, and a gear 14 is engaged with the gear 13 at the upper end of the lever 15.

In the embodiment of FIG. 5, the levers 5 and 15 are equipped with the gears 13 and 14 at the upper end, respectively. The levers 5 and 15 are pivotally mounted respectively on the shafts 35 and 36 which are carried by a connecting elbow or member 34, the shafts 35 and 36 being positioned to extend through the gears 13 and 14, respectively. The gears 13 and 14 are shaped alike, and the levers 5 and 15 are adapted to rotate in the same extent but in the opposite directions with respect to the connecting elbow 34.

A sprocket wheel 37 is fixedly carried on the shaft 35 which also carries the gear 13. The shaft 4 fixedly supports an additional sprocket wheel 38 which is of the same size and dimensions as the sprocket wheel 37, and which is coaxially mounted on the shaft 4. A chain 39 extends around the sprocket wheels 37 and 38. In the withdrawn position, the connecting elbow 34 is horizontal while the levers 5 and 15 are in the upright position as shown in FIG. 5.

At the lower end of the lever 15, an arm 40 similar to the arm 26 shown in FIG. 1 is located. The arm 40 is fixedly carried on a shaft 41 for pivotal movement with respect to the lever 15. A sprocket wheel 43 is fixedly carried on the shaft 41. The elbow 34 supports an additional sprocket wheel 42 which is of the same shape and dimensions as the sprocket wheel 43, and which is coaxially mounted on the shaft 36. The chain 44 extends around the sprocket wheels 43 and 44. The gear 14, the sprocket wheel 42, and the shaft 36 rotate as a unit. The same is also true of the gear 13, the sprocket 37, and the shaft 35.

Operation of the second embodiment as shown in FIG. 5 will now be described. The arm 40 is in the horizontal position shown in FIG. 5 when the levers 5 and 15 are in their upright positions. When the piston rod 10 extends downwardly and causes the lever 5 to rotate counterclockwise by an angle $\theta$, the mechanism including the sprocket wheels 37 and 38 and the chain 39, causes the connecting elbows to move in a parallel fashion. The engagement of the gears 13 and 14 causes the lever 15 to rotate clockwise by the same angle, $\theta$. Accordingly, the lower end of the lever 15 moves horizontally, maintaining its relative height as shown in FIG. 5. The motion of the lower end of the lever 15 is determined by operation of the mechanism, including the sprocket wheels 42 and 43 and the chain 44. Thus, the arm 40 is maintained parallel with the connecting elbow or member 34, and thus, the arm 40 remains horizontal throughout its range of movements. Therefore, the arm 40 advances horizontally, or to the left in FIG. 5, as it is extended. It retreats horizontally to the retracted position of FIG. 5 also. The lever 5 has a range of movement which is approximately 90° from its vertical or upright position of FIG. 5 until it is extended to the left in FIG. 5. The various sprocket wheels and chain drive provide a positive system interconnecting the various components of the extendible arm mechanism.

Attention is next directed to FIG. 6 of the drawings which illustrates an additional embodiment of the present invention. In FIG. 6, the lever 5 is mounted on a shaft 47 which extends through a fixed bracket 46 in the top of a column shaped structure 45. A movable crank arm 49 extends from the lever 5. The crank arm 49 is manipulated by means of the hydraulic cylinder 9. At the lower end, a support bracket 48 is joined to the column shaped structure 45, and extends laterally to position a pivot 50 for connection with the hydraulic cylinder 9. The piston rod 10 extends toward the crank arm 49. The pivotal connection between these two members is achieved through the use of a shaft or pin 51. In the fully retracted position of the piston rod, the lever 5 achieves an upright position as shown in FIG. 6. When the piston rod 10 is extended, the lever 5 turns counterclockwise from the position shown in FIG. 6.

The upper end of the lever 5 supports a bevelled gear 52. Attention is temporarily directed to FIG. 9 of the drawings which shows the upper end of the lever 5 which supports the bevel gear 52. A pin 54 extends through the end of the lever 5 and supports the bevel gear 52. An identical bevel gear 53 is fixedly carried on the upper end of an additional lever 15. As shown in FIG. 9, the levers 5 and 15 are both mounted on the shaft 54 which extends through the gears 52 and 53. At an intermediate location between the bevel gears 52 and 53 is a connecting member 57, analogous to the elbow member 16 in FIG. 1, which comprises two rods 55 and 56 which are joined at right angles to each other. This is more clearly shown in FIG. 6. The rods 55 and 56 comprise portions of the connecting member 57 which positions the rods at right angles to each other. The connecting member 57 is mounted on the shaft 54 at a point supporting the rods 55 and 56 at their intersection. The rod 55 carries and supports an intermediate bevel gear 58 which meshes with the bevel gears 52 and 53. A bushing 59 supports the bevel gear 58 on the rod 55. The gear 58 is rotatable about the rod 55 on which it is supported.

Figure 7:
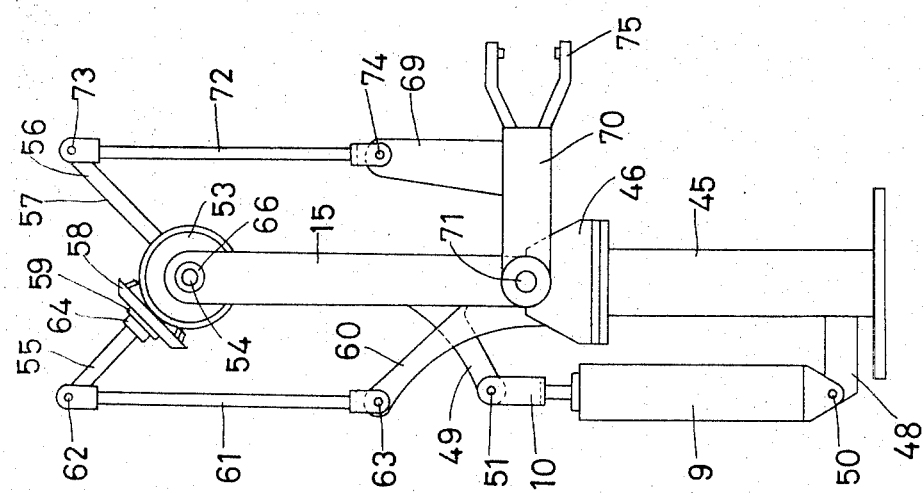
FIG. 7 is a left side view of the embodiment shown in FIG. 6.

As shown in FIGS. 6 and 7, a rod 61 which is the same length as the lever 5, is supported at both ends. The lower end of the rod 61 is connected with a fixed support arm 60 which projects from the columnar support structure 45. The rod 61 is supported at its upper end by the rod 55. Both connections are made pivotal through the use of connective shafts 62 and 63 at the upper and lower ends, respectively. The distance between the shafts 47 and 63 on the member 60 and the distance between the shafts 54 and 62 on the rod 55 are equal to each other.

As shown in FIG. 9, retaining means 64, 65 and 66 secure the three gears 52, 53 and 58 in engagement with one another. The shaft 54 supports a pair of bushings 67 and 68 which are loosely mounted on the shaft 54 and which limit the range of movement of the connective bracket 57.

As shown in FIG. 7, the lower end of the lever 15 supports an arm 70. The connection is made by means of the shaft 71 which permits the arm 70 to rotate with respect to the lever 15. The arm 70 supports an upwardly projecting connecting member 69 and a rod 72 which is of the same length as the lever 15 is fixed at both ends. The lower end of the rod 72 is fixed to the upwardly projecting mounting bracket 69. The upper end of the rod 72 is joined to the rod 56 as previously mentioned. Through the use of a pair of shafts 73 and 74, the rod 72 is pivotally connected at both ends. The distance between the shafts 54 and 73 on the rod 56, and the distance between the shafts 71 and 74 on the arm 70 are equal.

The arm 70 carries a rotary cylinder and appropriate apparatus similar to that shown in FIG. 1 in the first embodiment. A clamp chuck 75 is shown in FIGS. 6 and 7.

In the handling machine shown in FIGS. 6 – 9, a first parallelogram is defined by lines joining the shafts 54, 62, 63 and 47. These are the points J, K, L, and M, respectively, shown in FIG. 10. A second parallelogram is defined by lines joining the shafts 54, 73, 74 and 71, which are shown at points J, P, Q, and R, respectively, in FIG. 10. The two parallelograms are symmetrical with respect to each other about the vertical line from the point J to either of the points M or R in FIG. 10.

Considering now the operation of the embodiment shown in FIGS. 6 – 9, the hydraulic cylinder 9 extends the piston rod 10. With the levers 5 and 15 in their original upright position as shown in solid line in FIG. 10, angles of inclination of the member 60 and the arm 70 are thus defined. The angle of inclination of the member 60 is defined as $\alpha'$ while the angle of inclination of the arm 70 is defined as $\beta'$. The angles $\alpha'$ and $\beta'$ are equal to each other, and, of course, the arm 70 is held in the horizontal position.

On application of hydraulic power to the cylinder 9, the piston rod 10 is extended and the lever 5 turns counterclockwise to an angle $\theta$ as shown by the dot and dash lines in FIG. 10. The parallel motion mechanism represented by the parallelogram J - K - L - M causes the connecting elbow or member 57 to move in a parallel fashion and the bevel gear 52 rotates the intermediate bevel gear 58. Attention is momentarily directed to FIG. 6 of the drawings wherein the bevel gear 58 is shown rotating by the angle $\theta$ in the direction of the arrow X in FIG. 6. The rotation of the intermediate bevel gear causes the bevel gear 53 to rotate and the bevel gear 53 in turn causes the lever 15 to move clockwise and incline by an angle $\theta'$ with respect to the vertical line $V_1' - V_1'$ passing through the point $J_1$ in FIG. 10. Consequently, the parallelogram $J_1 - K_1 - L - M$ which is formed after the movement of the parallelogram J - K - L - M is symmetrical to the parallelogram $J_1 - P_1 - Q_1 - R_1$ which is formed after the movement of the parallelogram J - P - Q - R. The two parallelograms formed after movement through the angle $\theta'$ are symmetrical with respect to each other about the vertical line $V_1' - V_1'$. The angle $\alpha$ of the support arm or member 60 and the new angle $B_1'$ of the arm 70 are equal to each other inasmuch as the members 60 and 70 remain in their original angular positions shown in solid line in FIG. 10. Again, the arm 70 has advanced the distance $L_1'$ horizontally, or to the left as viewed in FIG. 10.

Considering the extension of the arm by an additional distance, the distance $L_2$ in FIG. 10. Again, the hydraulic cylinder 9 is further operated to advance the piston rod 10. The lever 5 is turned further counterclockwise through an angle $\theta_2$ as shown with broken lines in FIG. 10. The connecting member 57 moves arcuately as shown in FIG. 10, but remains ever parallel to the line or path of rectilinear movement of the arm 70. Movement of the connecting member 57 initiates operation of the bevel gear mechanism connected between the levers 5 and 15. The bevel gear 52 causes the intermediate bevel gear 58 to rotate by the angle $\theta_2$ in the direction of the arrow X in FIG. 6. The intermediate bevel gear 58 in turn causes the bevel gear 53 to rotate correspondingly, and the bevel gear 53, in turn, causes the lever 15 to turn or rotate clockwise to an angle $\theta_2$ with respect to the vertical line $V_2' - V_2'$ passing through the point $J_2$ in FIG. 10. After rotation through the angle $\theta_2$ a new parallelogram, $J_2 - K_2 - L - M$ is defined. This parallelogram is associated with the lever 5. Another parallelogram, newly defined, and associated with the lever 15, is likewise formed at the points $J_2 - P_2 - Q_2 - R_2$. The two parallelograms are symmetrical with each other with respect to a vertical line $V_2' - V_2'$. The angle of inclination $\alpha$ of the member 60 and the new angle $\beta_2$ of the arm 70 are equal to each other even though the arm is moved through the distance $L_2'$ horizontally.

The mechanism which causes the levers 5 and 15 to move in a manner such that the arm 50 remains horizontal is bidirectional in operation. Referring to the movement of the levers 5 and 15, and the arm 70 which is both extended and retracted in FIG. 10, the mechanism can extend and return to the original solid line position shown in FIG. 10. The parallel motion mechanism illustrated in the drawings causes the connecting member 57 to move in a parallel fashion back to its original position. The gears 52, 58 and 53 transfer the appropriate motion to the lever 15 to return it, ever maintaining the same angle with respect to the lever 5, and return the lever 15 to the original position. The retraction of the levers 5 and 15 causes the arm 70 to retreat along the path which was followed when it was extended or moved horizontally. It will be appreciated that the intermediate bevel gear 58 which meshes with the bevel gears 52 and 53 is rotated in the direction opposite that of the arrow X of FIG. 6 on retraction.

An economy of components in construction is achieved by utilizing the connecting member 57 to also support the bevel gear 58. Obviously, the gear 58 can be located at other points so long as it maintains a meshed interconnection with the two gears 52 and 53.

The three embodiments which are shown function in a similar manner. For instance, the embodiment 5 utilizes the chain 39 instead of the push rod 22 shown in FIG. 1. Obviously, a push rod such as that shown in FIG. 1 can be both push and pull. While a link chain or other similar apparatus functions only in tension, the chain extends on both sides of the lever 5 in FIG. 5 and tension on the portion of the chain to the left of the lever 5 corresponds to compression on the push rod 22 shown in FIG. 1. By the same token, the push rods 61 and 72 shown in FIG. 6 and 7 correspond to the rods 22 and 28 shown in FIG. 1. Additionally, correspondence is found in the connective elbow 16 which joins together the levers 5 and 15 in the first embodiment. While it is of slightly different construction in FIG. 5, the connective member 34 functions in the same manner as the elbow mentioned with regard to the embodiment of FIGS. 1 - 4, inclusive. Even further, the same is true of the connective member 57 illustrated in the last embodiment described.

As heretofore described by way of several embodiments, the several invention is intended to provide a new and improved device for causing the arm of a mechanical handling machine to move in a horizontal, rectilinear direction. The device normally includes a support structure for mounting the mechanical handling machine. The apparatus incorporates a pair of levers which move or deflect through symmetrical angles, keeping in view that the levers are connected by a type of elbow mechanism. The elbow mechanism transfers a certain type of movement from the first lever to the second. The mechanical handling machine utilizes stiff links, pulleys, belts, sprockets and chains, or the like, for maintaining each armed segment in a particular relationship to the other armed segments. A pair of symmetrical and similar parallel motion parallelograms are thusly incorporated in the structure describing the first pair of armed segments. Quite clearly, many different substitutions and alterations in the present invention may be readily accommodated. The scope of the present invention is determined by the claims which are appended hereto.

What is claimed is:

1. Handling apparatus comprising:
   a base;
   a first arm having one end portion pivotally coupled to said base for rotation about a first axis perpendicular to a predetermined plane;
   a rigid link member having one end portion pivotally coupled to the other end portion of said first arm for rotation about a second axis perpendicular to said plane;
   a second arm having one end portion pivotally coupled to the other end portion of said link member for rotation about a third axis perpendicular to said plane;
   selectively-operable handling means coupled to the other end portion of said second arm;
   actuating means operatively coupled to said first arm and adapted for selectively rotating said first arm between selected angular positions lying in said plane; and
   motion-controlling means adapted for limiting movement of said handling means to rectilinear motion upon rotation of said first arm between its said selected positions, said motion-controlling means including
   a first pair of rigid members respectively coupled to said one end portion of said first arm and of said link member and respectively having portions thereof extending outwardly equal distances and at equal angles to said first arm for defining a first pair of pivots respectively having a pivot axis perpendicular to said plane,
   a second pair of rigid members respectively coupled to said other end portion of said second arm and of said link member and respectively having portions thereof extending outwardly equal distances and at equal angles to said second arm for defining a second pair of pivots respectively having a pivot axis perpendicular to said plane,
   first and second tension members respectively coupled between said pivot axes of said first and second pairs of said rigid members and respectively extending parallel to said first and second arms, and
   gear means operatively arranged for transmitting rotative movement between said other end portion of said first arm and said one portion of said second arm upon rotation of said first arm between its said positions to move said handling means along a straight line.

2. The handling apparatus of claim 1 wherein said handling means include material-gripping means and selectively-operable means for actuating said material-gripping means.

3. The handling apparatus of claim 1 wherein said first and second pairs of rigid members are comprised of outstanding brackets respectively having said first and second pairs of pivots respectively lying in said pivot axes; and said first and second tension members are comprised of rigid members respectively pivotally coupled to said pivots.

4. The handling apparatus of claim 1 wherein said first and second pairs of rigid members are comprised of first and second pairs of circular gears respectively mounted on the axes at each end portion of said first and second arms and respectively having teeth in a circle concentric with said pivot axes; and said first and second tension members are comprised of first and second sprocket chains respectively looped around said first and second pairs of circular gears for carrying tension loads between said pivot axes as defined by said gear teeth.

5. The handling apparatus of claim 1 wherein said first and second arms lie in said predetermined plane so that said handling means will be moved in said predetermined plane; and wherein said gear means include first and second intermeshed gears respectively lying in said predetermined plane.

6. The handling apparatus of claim 5 wherein said first and second pairs of rigid members are comprised of outstanding brackets respectively having first and second pairs of pivots respectively lying in said pivot axes; and said first and second tension members are comprised of rigid members respectively pivotally coupled to said pivots.

7. Handling apparatus comprising
   a. a base;
   b. a first arm having one end portion pivotally coupled to said base for rotation about a first axis;
   c. a link member having at least two connective portions with one of said connective portions connected to the free end portion of said first arm;
   d. a second arm having one end portion connected to the other connective portion of said link member;
   e. selectively operable handling means coupled to the other end portion of said second arm;

f. actuating means operatively coupled to said first arm and adapted for selectively rotating said first arm between selected angular positions;
g. motion-controlling means adapted for limiting movement of said handling means to rectilinear motion upon rotation of said first arm between its selected positions, said motion-controlling means including:
   i. a first pair of rigid members operatively respectively coupled to said one end portion and connective portion of said first arm and said link member, and each extending outwardly equal distances and at equal angles to said first arm for defining a first pair of pivots;
   ii. a second pair of rigid members operatively respectively coupled to the other end portion and connective portion of said second arm and said link member, and each extending outwardly equal distances and at equal angles to said second arm for defining a second pair of pivots;
   iii. first and second tension members respectively coupled said pivot axes of said first and second pairs of rigid members and respectively extending parallel to said first and second arms; and
   iv. gear means operatively arranged for transmitting rotative movement from the free end of said first arm to the one end portion of said second arm upon rotation of said arm between its positions to move said handling means along a straight line.

8. The handling apparatus of claim 7 wherein said first and second arms lie in first and second spaced planes parallel to a predetermined plane so that said handling means will be moved in said second plane; and wherein said gear means include first and second bevel gears respectively arranged on said first and second arms for rotation in said first and second planes, and a third bevel gear cooperatively arranged between said first and second bevel gears for rotation in a plane perpendicular to said first and second planes.

9. The handling apparatus of claim 8 wherein said first and second pairs of rigid members are comprised of outstanding brackets respectively having said first and second pairs of pivots respectively lying in said pivot axes; and said first and second tension members are comprised of rigid members respectively pivotally coupled to said pivots.

* * * * *

UNITED STATES PATENT OFFICE
CERTIFICATE OF CORRECTION

Patent No. 3,731,820      Dated May 8, 1973

Inventor(s)   Akira Niki et al.

It is certified that error appears in the above-identified patent and that said Letters Patent are hereby corrected as shown below:

On the cover sheet [75] "Akiri Niki" should read -- Akira Niki --.

Signed and sealed this 29th day of January 1974.

(SEAL)
Attest:

EDWARD M. FLETCHER, JR.      RENE D. TEGTMEYER
Attesting Officer      Acting Commissioner of Patents